US005493767A

United States Patent [19]
Susnjara

[11] Patent Number: 5,493,767
[45] Date of Patent: Feb. 27, 1996

[54] SYSTEM AND METHOD FOR POSITIONING WORKPIECES ON CNC MACHINES

[75] Inventor: Kenneth J. Susnjara, Santa Claus, Ind.

[73] Assignee: Thermwood Corporation, Dale, Ind.

[21] Appl. No.: 356,487

[22] Filed: Dec. 15, 1994

[51] Int. Cl.⁶ ..................................................... B23Q 7/00
[52] U.S. Cl. ............... 29/559; 269/21; 269/303; 409/132; 144/134 A; 144/144 R; 144/137
[58] Field of Search .................. 29/464, 466, 468, 29/559, 283; 269/21, 303; 409/130, 131, 132, 218, 138; 144/134 R, 134 A, 144 R, 137

[56] References Cited

U.S. PATENT DOCUMENTS

| | | | |
|---|---|---|---|
| 4,656,791 | 4/1987 | Herrington et al. | 269/21 |
| 4,747,589 | 5/1988 | Watson et al. | 269/21 |
| 4,795,518 | 1/1989 | Meinel et al. | 269/21 |
| 4,808,046 | 2/1989 | Pilkington et al. | 409/132 |
| 5,224,406 | 7/1993 | Nasu | 269/21 |
| 5,226,211 | 7/1993 | Jones | 29/559 |

*Primary Examiner*—David P. Bryant
*Attorney, Agent, or Firm*—Lalos & Keegan

[57] ABSTRACT

An assembly for positioning a pattern on a workpiece on the worktable of a computer controlled machine in a predetermined position, for performing a work function on the workpiece, comprising first reference points disposed on the worktable having a predetermined spatial relationship to the pattern in the predetermined position, a transfer piece having second reference points registrable with the first reference points and locator points registrable with the workpiece pattern, the second reference points being disposed in a predetermined spatial relationship to the locator points, a system for detachably securing the workpiece to the transfer piece when the locator points are disposed in registry with the workpiece pattern, and a system for detachably securing the workpiece to the worktable when the workpiece pattern is disposed in the predetermined position.

34 Claims, 4 Drawing Sheets

SYSTEM AND METHOD FOR POSITIONING WORKPIECES ON CNC MACHINES

This invention relates to machining workpieces on CNC machines and more particularly to a system and method for positioning workpieces on such machines for performing work functions thereon such as routing, sawing, sanding, drilling and the like.

In the production of various panel components used in the manufacture of furniture and the like, it is a conventional practice to provide a rough cut of a substrate panel, adhesively apply a veneer of a decorative material in a selected pattern on a planer surface of the substrate panel and then trim the excess substrate material to provide a finished machined product. Typically, such excess substrate material is removed by mounting the workpiece on the worktable of a CNC router machine and routing the substrate in accordance with a program loaded into a controller of the machine which functions to guide a router bit along a prescribed motion path. In doing so, the veneer pattern on the workpiece is repaired to be precisely positioned so that the router bit will follow an accurate prescribed path about the periphery of the veneer pattern.

Typically, workpieces to be machined in accordance with a selected program are positioned on worktables of CNC machines by positioning one or two side edges of a workpiece along selected x and/or y reference axes corresponding to a cartesian coordinate system relative to the plane of the worktable. In the machining of the type of workpiece as described, because of either the irregular configuration of the periphery of the substrate or the difficulty in securing the veneer on the substrate at the precise position relative to the reference edges of the substrate, it is not possible to precisely position such workpiece on the machine in the conventional manner. Accordingly, various more elaborate methods have been required to position such workpieces on machine tables including the use of various laser and other imaging systems which are more complex and expensive to use compared to simply positioning a side edge of a workpiece against an abutment surface of a fixture mounted on the worktable. It thus has been found to be desirable to provide an improved system and method of precisely positioning a workpiece of the type described on CNC machines for performing various machining functions thereon.

Accordingly, it is the principal object of the present invention to provide an improved system and method for positioning a workpiece on the worktable of a machine tool.

Another object of the present invention is to provide an improved system and method for precisely positioning a workpiece on the worktable of a CNC machine for performing a work function thereon in accordance with a selected program.

A further object of the present invention is to provide an improved system and method for positioning a pattern of a laminate disposed on a substrate for performing a work function on the substrate portion of the workpiece.

Another object of the present invention is to provide an improved system and method of positioning on a worktable of a machine, a workpiece consisting of a substrate having a laminate thereon of a selected pattern, in which the substrate may be provided with an irregular peripheral configuration or the laminate may be misplaced on the substrate relative to otherwise utilized reference edges of the substrate, without the use of elaborate, complex or expensive positioning devices.

A further object of the present invention is to provide an improved system and method of positioning a workpiece consisting of a substrate provided with an irregular peripheral configuration and a laminate disposed in a selected pattern on the substrate, for machining the substrate portion of the workpiece, utilizing conventional fixturing devices.

A still further object of the present invention is to provide an improved method of positioning a veneer having a selected pattern, adhesively secured to a substrate material having an irregular peripheral configuration, on the worktable of a CNC machine for machining the substrate portion of such machine which is simple in procedure, expedient in use and efficient in operation.

Another object of the present invention is to provide an improved method of positioning a workpiece consisting of a substrate and a laminate having a selected pattern secured to a surface of the substrate, on the worktable of a machine for machining the substrate about a periphery of the laminate pattern, in which the laminate pattern may be randomly positioned on the substrate independent of any reference means of the substrate yet be precisely positioned on the worktable of the machine relative to a programmed motion path of a machine tool used to machine the substrate.

A further object of the present invention is to provide an improved system for positioning a workpiece consisting of a substrate material having an irregular peripheral configuration and a veneer of a selected pattern adhesively secured to an upper surface of the substrate, for machining the substrate portion of the workpiece, without the use of elaborate, complicated or expensive devices, which is simple in design, inexpensive to produce and highly effective in performance.

Other objects and advantages of the present invention will become more apparent to those persons having ordinary skill in the art to which the present invention pertains from the following description taken in conjunction with the accompanying drawings wherein.

Figure 1:
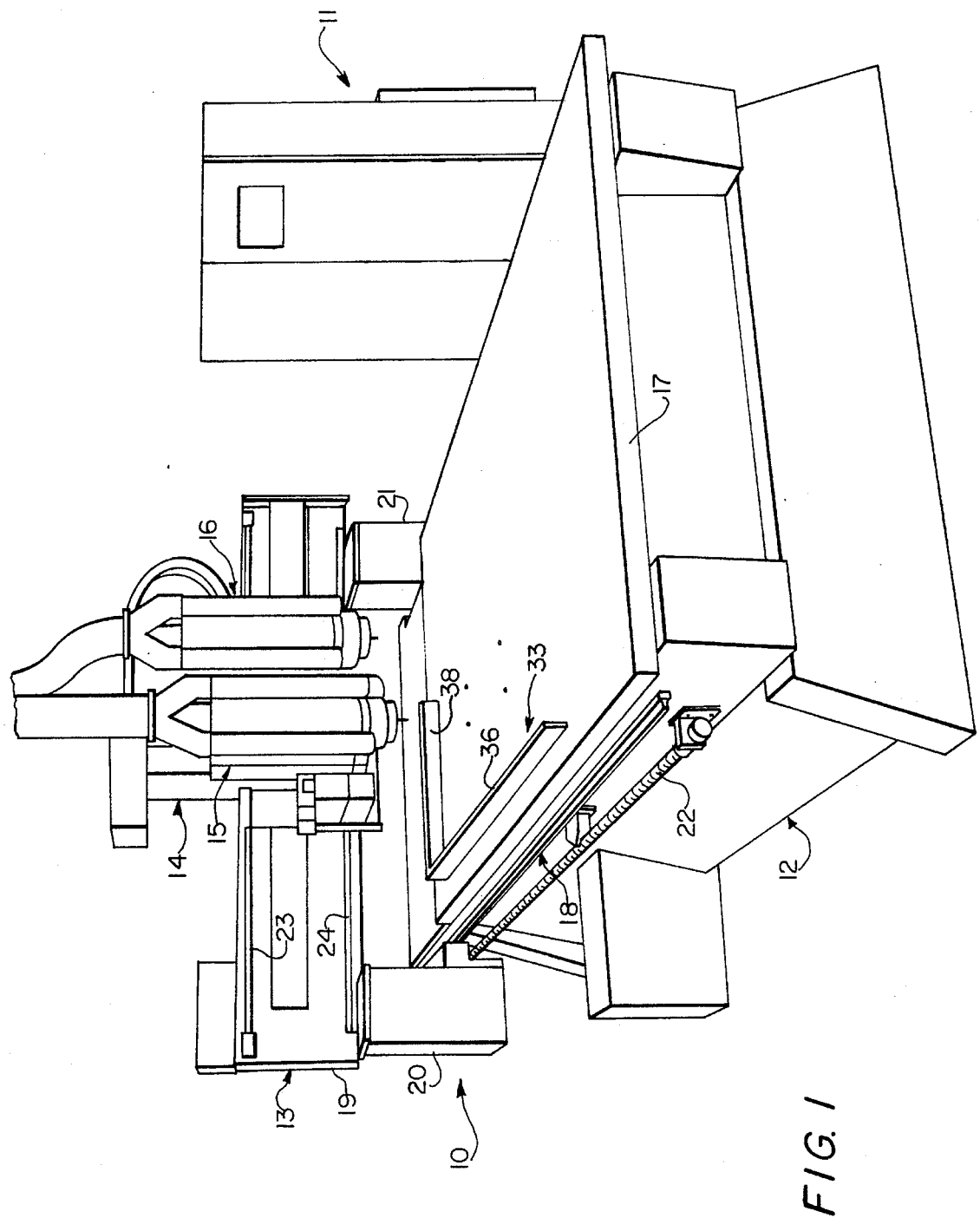
FIG. 1 is a perspective view of a CNC machine equipped with components of a system for positioning a workpiece consisting of a substrate material having a veneer of a selected pattern, on the worktable thereof.
Figure 2:
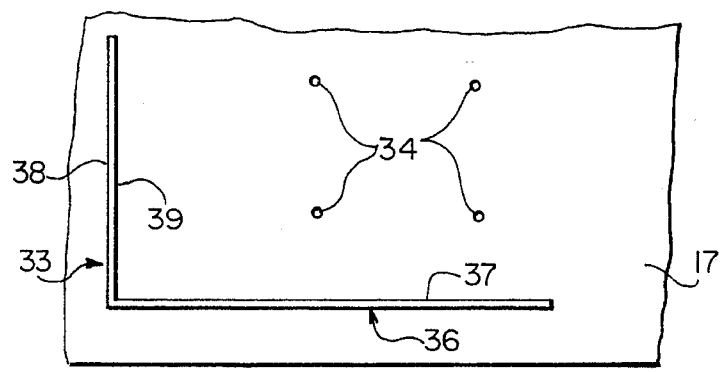
FIG. 2 is a partial, top plan view of the worktable shown in FIG. 1, illustrating components of such system.
Figure 3:
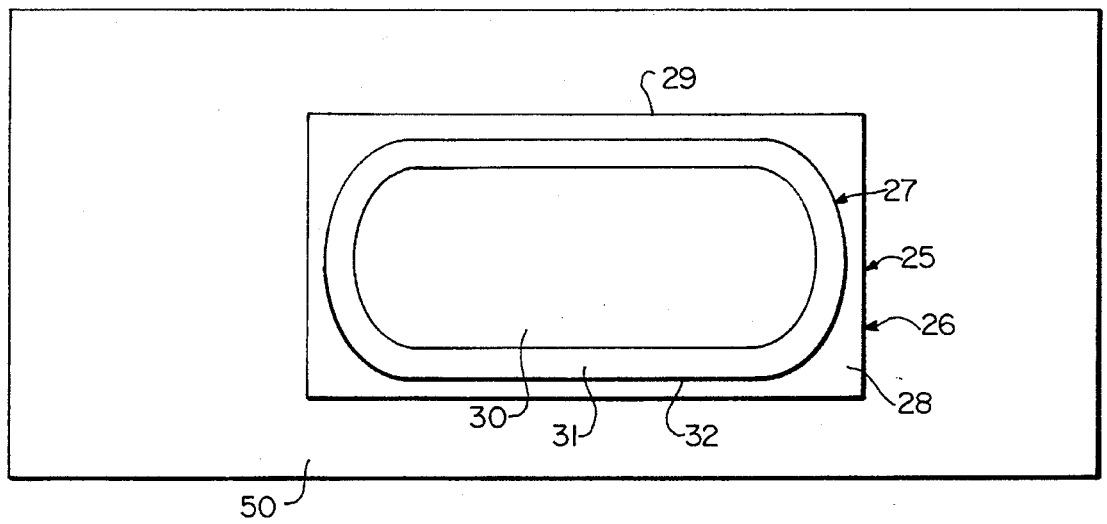
FIG. 3 is a top plan view of a workpiece adapted to be precisely positioned on the worktable of the machine shown in FIG. 1, utilizing the system embodying the present invention.
Figure 4:
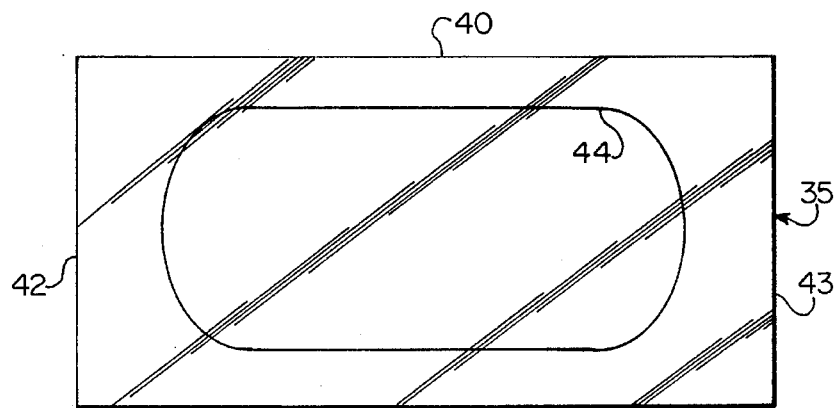
FIG. 4 is a top plan view of a template constituting a component of such system.
Figure 5:
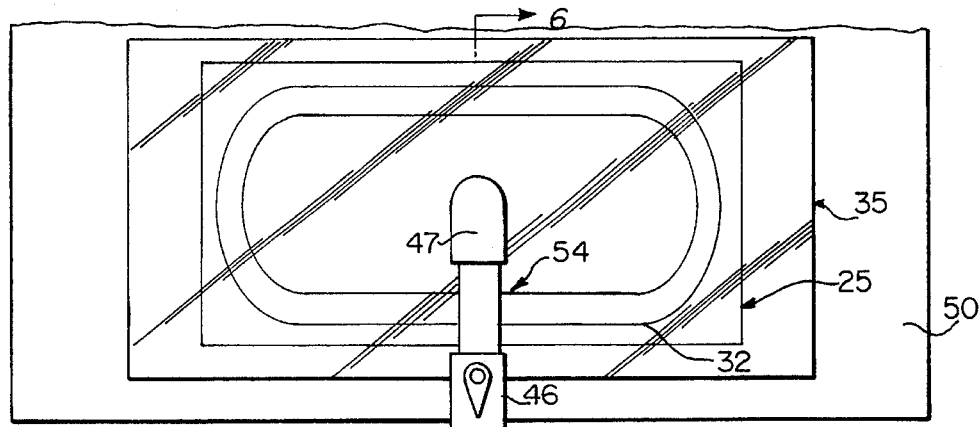
FIG. 5 is a top plan view of the template shown in FIG. 4 superimposed on the workpiece shown in FIG. 3 in accordance with the method embodying the present invention.
Figure 6:
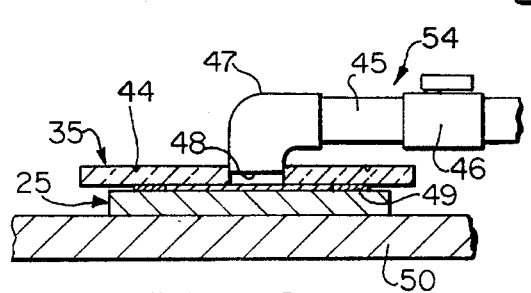
FIG. 6 is a cross-sectional view taken along line 6—6 in FIG. 5.
Figure 8:
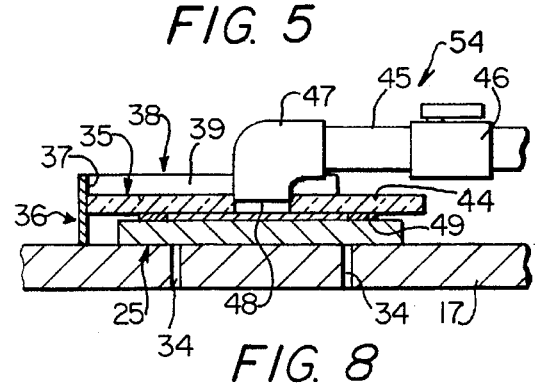
FIG. 8 is a cross-sectional view taken along line 8—8 in FIG. 7.
Figure 7:
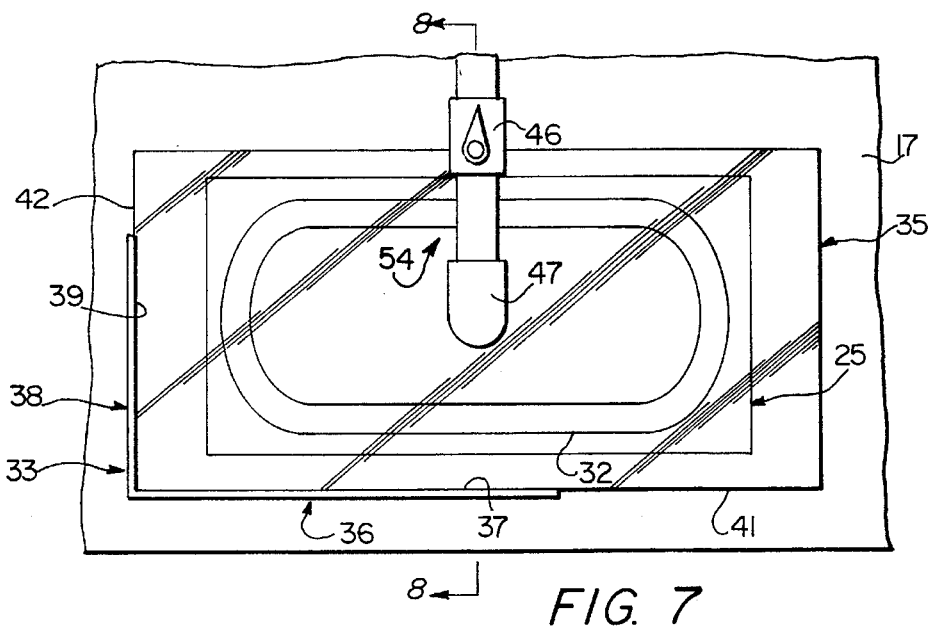
FIG. 7 is a view similar to the view shown in FIG. 5, illustrating the workpiece being positioned on the worktable of the machine shown in FIG. 1, utilizing the method embodying the present invention.

Referring to FIG. 1, there is illustrated a CNC machine 10 and a controller 11 operatively connected to the machine for displacing a tool of the machine along a longitudinal line of travel or an x-axis, a transverse line of travel or a y-axis of a cartesian coordinate system, and further along a vertical line of travel or a z-axis in accordance with a program loaded into the controller to perform a work function on a workpiece positioned on the machine. Generally, the machine includes a base member 12, a bridge or gantry member 13, a toolhead support assembly 14 and a pair of toolhead assemblies 15 and 16. The base member is provided with a worktable 17 rigidly mounted on the base member and a pair of trackways 18, 18 mounted on the sides of the base member and disposed parallel to the x-axis of the machine. Worktable 17 is adapted to support a workpiece to be machined.

The bridge member of the machine includes a transversely disposed beam section 19 spaced above and spanning the base member and a pair of transversely spaced, depending leg sections 20 and 21 flanking the sides of the base member and mounted on trackways 18, 18 for displacement relative to the base member along the x-axis. The bridge member is displaced relative to the base member along the x-axis by means of a pair of drive screw assemblies 22, 22 operatively interconnecting the side portions of the base member and the inner side portions of leg sections 20 and 21.

Toolhead support assembly 14 is supported on and guided along a pair of transversely disposed, vertically spaced trackways 23 and 24 disposed on a front face of transverse beam section 19, and is displaced along the y-axis by a drive screw assembly operatively interconnecting the bridge member and the toolhead support assembly. Each of the toolhead assemblies is supported and displaceable vertically along trackways mounted on mounting support assembly 14 and is adapted to be displaced by a drive screw assembly operatively interconnecting the support assembly and the toolhead assembly. Each of the toolhead assemblies further is provided with a depending tool such as a router, drill, sanding wheel and the like adapted to be brought into contact with a workpiece mounted on worktable 17 to perform various work functions such as routing, sawing, sanding and the like in accordance with the program loaded into the controller.

The present invention provides a system for positioning a workpiece 25 on worktable 17 of the machine shown in FIG. 1. The workpiece consists of a substrate 26 and a laminate 27 disposed on the substrate. The substrate consists of a panel member formed of wood or any other material, having an upper planer surface 28 and an irregular peripheral edge 29. Laminate 27 is secured to upper surface 28 of the substrate and includes an inner portion 30 and an outer portion 31 having an outer peripheral edge 32 providing a defined pattern. The workpiece as described may consist of a panel component of a piece of furniture such as a table top or a desk top having a substrate formed of a rigid type of wood and a veneer of a decorative type of wood adhesively secured to the substrate in which, the excess portion of the substrate exteriorly of peripheral edge 32 of the veneer is to be removed by trimming with a router tool.

The system for positioning workpiece 25 on table 17 of the machine tool shown in FIG. 1, for removing the excess substrate, consists of a positioning fixture 33 mounted on worktable 17, a suction system 34 provided on the machine for securing a workpiece mounted on worktable 17, a template 35 and a suction system 54 operatively connected to template 35. Positioning fixture 33, commonly referred to as a "fence" consists of a wall member 36 mounted on worktable 17, providing a vertically disposed, inwardly facing abutment surface 37 disposed along a selected x-axis of the cartesian coordinate system coinciding with the plane of the worktable, and a wall member 38 also mounted on the worktable at a right angle to wall member 36, providing a vertically disposed, inwardly facing abutment surface 39 disposed along a y-axis of the coordinate system of the machine. The suction system on the machine includes a number of openings 34 disposed in the worktable in an area generally bounded by abutment surfaces 37 and 39 across which a workpiece may be positioned for holding the workpiece onto the worktable upon operation of the suction system.

Template 35 consists of a plate of transparent material, preferably plexiglass, having a generally rectangular configuration with a set of side edges 40, 41, 42 and 43. In the preparation of the template for use in mounting workpiece 25 on worktable 17 with the pattern of peripheral edge 32 positioned on the worktable relative to a predetermined position corresponding to a program loaded in the controller of the machine for guiding a router bit of the machine along a motion path to remove the excess portion of the substrate of the workpiece, the template is provided with locator indicia in the form of at least two points or a continuous line such as line 44 etched or otherwise marked on the upper or lower surface of the template which is disposed in a predetermined spatial relation relative to reference side edges 41 and 42 of the template representing x and y-axes, and adapted to register with peripheral edge 32 of laminate 27 when the template is superimposed on workpiece 26. The machine pattern defined by the configuration of the programmed motion path of the machining tool of the machine and the template pattern defined by the configuration of locator line 44 of the template, are equivalent to the laminate pattern defined by the configuration of laminate peripheral line 32, and the spatial relation of the template pattern relative to reference side edges 41 and 42 of the template, is the equivalent of the spatial relation of the machine pattern relative to the x and y-axes corresponding to abutment surfaces 37 and 39. Correspondingly, any two locator points on template locator line 44 corresponding to comparable points on laminate border line 32, having coordinates x, y and x', y' relative to x and y-axes coinciding with template reference edges 41 and 42, have a spatial relationship relative to such axes equivalent to the spatial relationship of corresponding comparable points in the motion path of the machine tool, having similar coordinates x, y and x', y' relative to similar x and y-axes coinciding with abutment surfaces 37 and 29.

Template 35 is adapted to be superimposed on workpiece 26 with locator line 44 disposed in registry with laminate peripheral edge 32 and workpiece 25 is adapted to be detachably secured to template 35 by means of suction system 54. Such system includes a vacuum pump (not shown) and a flexible air line 45 provided with a valve 46 and a fixture 47 mounted on the end thereof, secured or otherwise detachably connected to the upper side of the template and communicating through an opening 48 with the underside of the template. The underside of the template is provided with a peripheral, resilient seal 49 which is adapted to engage and seal against the workpiece when the template is disposed on the workpiece in superimposed relation to form a closed chamber between the template and the workpiece which may be evacuated to detachably secure the workpiece to the template.

Figure 9:
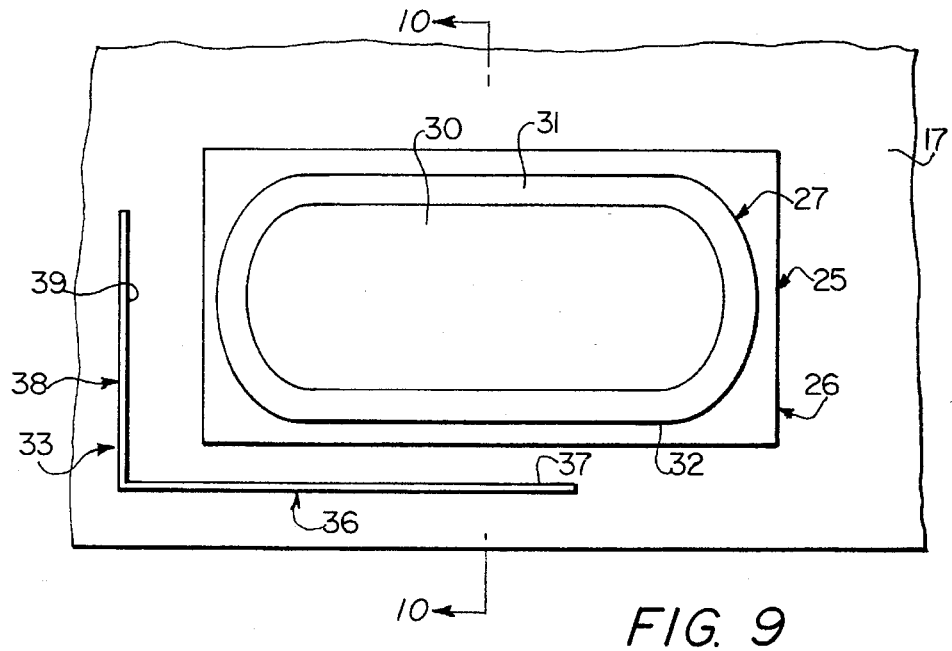
FIG. 9 is a top plan view of the workpiece in its proper position after the template has been removed.
Figure 10:
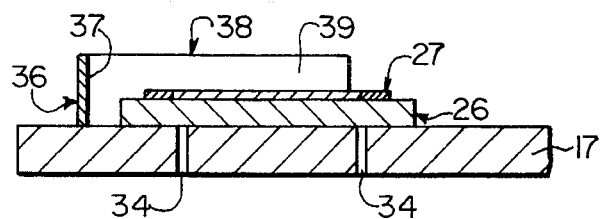
FIG. 10 is a cross-sectional view taken along line 10—10 in FIG. 9.
Figure 11:
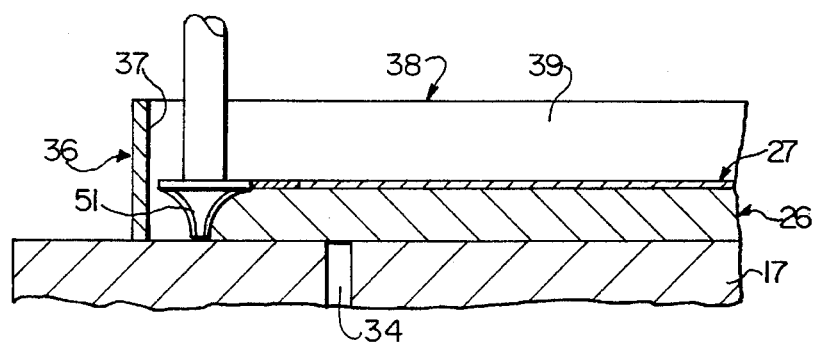
FIG. 11 is a cross-sectional view of a routing bit in engagement with the peripheral edge of the workpiece.

By reason of the laminate, machine and template patterns being equivalent, and the spatial relationship of the template pattern to the axes of reference edges 41 and 42 being equivalent to the spatial relationship of the machine pattern to the axes of abutment surfaces 37 and 39, the workpiece may be precisely mounted on worktable 17 for machining off the excess portion of substrate by positioning workpiece 25 on a workbench 50 or another working surface including a portion of worktable 17, superimposing template 35 on the workpiece with locator line 44 disposed in registry with peripheral line 32 of the laminate and peripheral seal 49 engaging the substrate portion of the workpiece, opening valve 46 to evacuate the closed chamber between the template and the workpiece to detachably secure the workpiece to the template, transferring the template with the workpiece attached thereto as a unit onto the worktable of the machine so that the workpiece is positioned on the worktable and reference side edges 41 and 42 of the template engage abutment surfaces 37 and 39, respectively, to position peripheral edge 32 of the laminate in a position corresponding to the programmed motion path of the routing bit, operating vacuum system 34 on the machine to detachably secure the workpiece in position on the worktable, closing valve 46 of vacuum system 54 to release the template from the workpiece and then removing the template from the area of the worktable of the machine so that the workpiece and particularly peripheral edge 32 of laminate 27 will be positioned relative to positioning fixture 33 as shown in FIGS. 9 and 10. The workpiece then is in a condition to undergo the programmed machining function as shown in fibre 11 whereby a router bit 51 is guided along a motion path coinciding with peripheral edge 32 of laminate 27 to remove the excess substrate portion of the workpiece to provide a finished machining product.

It will be appreciated that by programming the machine to cause the router bit thereof to follow a motion path defining the machine pattern comparable to the laminate pattern, with such machine pattern having a predetermined spatial relationship to a given x and y set of axes of a cartesian coordinate system, corresponding to abutment surfaces 37 and 39 of the positioning fixture, and by providing the template with a locator pattern comparable to the laminate pattern and adapted to be superimposed and registered with the laminate pattern, with the locator pattern having the same predetermined spatial relationship to the given x and y-axes of such coordinate system, corresponding to side edges 41 and 42 of the template, the method as described may be used to precisely position the laminate pattern in a position on the worktable of the machine coinciding with the machine pattern, allowing the router bit to follow its programmed motion path to remove excess substrate material, regardless of the configuration or condition of the peripheral portion of the substrate or the relative position of the laminate pattern relative to the substrate.

In a further aspect of the invention, it may not be required to position the workpiece relative to the template, secure the workpiece in position to the template and transfer the template with the attached workpiece onto the worktable, for accurately positioning the workpiece pattern on the machine. More simply, the workpiece may be placed on the worktable with the pattern thereon positioned in the general vicinity of its final position, the template may be placed on the workpiece with the reference edges thereof abutting the reference surfaces of the machine fixture, the workpiece may be moved relative to the template to register the workpiece pattern with the locator pattern on the template, the workpiece may be detachably secured in such final position on the worktable and the template may be removed to provide for the workpiece to be properly positioned for the machining operation. In utilizing such a procedure, the template functions only as a locator device and not as a combination locator and transfer device.

Although the template has been described as a plate formed of a transparent material with two reference edges and a locator pattern corresponding to the laminate pattern and positioned in a predetermined spatial relationship with the reference edges thereof, it is contemplated that any form of template may be used in which the workpiece may be detachably secured to the template with the laminate pattern having a spatial relationship to reference means thereon comparable to the same spatial relationship between the machining pattern and corresponding reference means on the worktable of the machine. Furthermore, in lieu of a locator line being provided on the template comparable to line 44 for positioning the laminate pattern relative to the reference means of the template, two or more locator points may be utilized which would be adapted to be registered with comparable locator points on the laminate pattern.

It is contemplated that the locator pattern, line or lines or points on the template can be permanently or temporarily placed thereon. Such indicia may be permanently provided on transparent templates by scoring, etching or otherwise marking the indicia thereon. The indicia further may be temporarily marked on transparent templates with marking substances which could be wiped or washed off to permit the reuse of the templates with workpieces of other laminate patterns.

It further would be appreciated that the system as described is not only simple in design and reliable in performance but comparatively easy to use allowing the use of unskilled operators.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A system for positioning a pattern on a workpiece on a worktable of a computer controlled machine in a predetermined position, for performing a work function on said workpiece, comprising:

a first reference means disposed on said worktable having a predetermined spatial relationship to said pattern in said predetermined position;

transfer means having second reference means registrable with said first reference means and locator means registrable with said workpiece pattern, said locator means being disposed in said predetermined spatial relationship to said second reference means;

means for detachably securing said workpiece to said transfer means when said locator means is disposed in registry with said workpiece pattern; and means for detachably securing said workpiece to said worktable when said workpiece pattern is disposed in said predetermined position;

whereby upon registering said locator means of said transfer means with said workpiece pattern and operating said first mentioned securing means to detachably secure said workpiece to said transfer means, transferring said transfer means with the attached workpiece onto said worktable with said workpiece disposed on said table and said second reference means of said transfer means disposed in registry with said first reference means, operating said second mentioned securing means to detachably secure said workpiece to said worktable, operating said first mentioned securing means to detach said workpiece from said transfer means and removing said transfer means, said workpiece will be positioned on said worktable with said pattern thereof in said predetermined position, ready for a work function to be performed thereon.

2. A system according to claim 1 wherein said predetermined position of said workpiece pattern, said first and second reference means and said locator means are disposed relative to a cartesian coordinate system.

3. A system according to claim 2 wherein said first and second reference means lie along selected x and y-axes.

4. A system according to claim 3 wherein said locator means includes at least two loci having coordinates x, y and x', y'.

5. A system according to claim 2 wherein said predetermined position of said workpiece pattern provides for a predetermined orientation of said pattern relative to selected x and y-axes of said system.

6. A system according to claim 1 wherein said means for detachably securing said workpiece to said transfer means comprises a suction means.

7. A system according to claim 1 wherein said means for detachably securing said workpiece to said worktable comprises a suction means.

8. A system according to claim 1 wherein said transfer means comprises a template.

9. A system according to claim 8 wherein said first reference means includes locating means of a predetermined configuration disposed on said worktable and said second reference means includes locating means of a predetermined configuration registrable with said worktable locating means.

10. A system according to claim 9 wherein said locating means corresponds to x and y-axes of a cartesian coordinate system.

11. A system according to claim 8 wherein said locator means of said template comprises at least two locator points registrable with corresponding points of said workpiece pattern.

12. A system according to claim 11 wherein two of said locator points correspond to x, y and x', y' coordinates of a cartesian coordinate system.

13. A system according to claim 1 wherein said workpiece comprises a substrate provided with a laminate having said pattern.

14. A system for positioning a pattern of a workpiece on a worktable of a computer controlled machine in a predetermined position, for performing a work function on said workpiece, comprising:

means disposed on said worktable defining first and second reference lines having a predetermined spatial relationship to said pattern in said predetermined position;

a template having first and second reference lines registrable with said first and second reference lines disposed on said worktable, and at least two locator points registrable with corresponding points on said workpiece pattern, disposed on said template in said predetermined spatial relationship relative to said first and second reference lines of said template;

means for detachably securing said workpiece to said template when said locator points on said template are registered with said corresponding points on said workpiece pattern;

means for detachably securing said workpiece to said template when said locator points of said template are disposed in registry with said corresponding points of said workpiece pattern; and means for detachably securing said workpiece to said worktable when said workpiece pattern is disposed in said predetermined position;

whereby upon registering said locator points of said template with said corresponding points of said workpiece pattern and operating said first mentioned securing means to detachably secure said workpiece to said template, transferring said template with the attached workpiece onto said worktable with said workpiece positioned on said table and said first and second reference lines of said template disposed in registry with said first and second reference lines of said means disposed on said worktable, operating said second mentioned means to detachably secure said workpiece to said worktable, operating said first mentioned securing means to detach said workpiece from said template and removing said template, said workpiece will be positioned on said worktable with said pattern disposed in said predetermined position, ready for a work function to be performed thereon.

15. A system according to claim 14 wherein said reference lines of said means disposed on said worktable and said template correspond to x and y-axes of a cartesian coordinate system.

16. A system according to claim 14 wherein two of said locator points of said template correspond to x, y and x', y' coordinates of a cartesian coordinate system.

17. A system according to claim 14 wherein said reference lines of said template comprise side edges thereof.

18. A system according to claim 17 wherein said reference lines of said means disposed on said worktable and said template correspond to x and y-axes of a cartesian coordinate system.

19. A system according to claim 17 wherein two of said locator points of said template correspond to x, y and x', y' coordinates of a cartesian coordinate system.

20. A system for positioning a pattern on a workpiece on a worktable of a computer controlled machine in a predetermined position for performing a work function on said workpiece, comprising;

means disposed on said worktable defining first and second abutment surfaces lying in planes disposed in predetermined spatial relationship to said pattern disposed in said predetermined position;

a template having first and second reference edges engagable with said first and second abutment surfaces, respectively, and at least two locator points of an imaginary replica of said workpiece pattern superimposed on said template, registrable with corresponding points of said workpiece pattern;

means for detachably securing said workpiece to said template with said locator points of said template registering with said corresponding points of said workpiece pattern; and means for detachably securing said workpiece to said worktable when said workpiece is disposed on said worktable and said pattern thereon is disposed in said predetermined position;

whereby when said template is positioned on said workpiece with said locator points of said template registering with corresponding points of said workpiece pattern and said first mentioned securing means is operated to detachably secure said workpiece to said template, said template and attached workpiece are moved onto said worktable with said workpiece positioned on said worktable and said reference edges of said template engaging said abutment surfaces to position said workpiece pattern in said predetermined position, said first and second mentioned securing means are operated to detachably secure said workpiece to said worktable and release said template from said workpiece, and said template is removed, said workpiece will be positioned on said worktable with said pattern thereof in said predetermined position, ready for a work function to be performed thereon.

21. A system according to claim 20 wherein said abutment surfaces lie in planes corresponding to x and y-axes of a cartesian coordinate system.

22. A system according to claim 21 wherein two of said locator points correspond to x, y and x', y' coordinates of said cartesian coordinate system.

23. A system according to claim 20 wherein said template is formed of a transparent material and said locator points comprise indicia thereon registrable with said corresponding points on said workpiece pattern when said template is superimposed on said workpiece.

24. A system according to claim 23 wherein said template is formed of a clear plexiglass material.

25. A system according to claim 20 wherein said first mentioned means for detachably securing said workpiece to said template comprises suction means.

26. A system according to claim 20 wherein said second mentioned means for detachably securing said workpiece to said worktable comprises suction means.

27. A system according to claim 20 wherein said workpiece comprises a substrate provided with a laminate having said pattern.

28. A system according to claim 27 wherein said substrate comprises a wood material and said laminate comprises a wood veneer adhesively secured to said substrate.

29. A system according to claim 20 wherein said template is provided with a marking replicating said workpiece pattern which is disposed in said spatial relationship to said reference edges and is registrable in superimposed relation to said workpiece pattern.

30. A method of positioning a pattern on a workpiece on a worktable of a computer controlled machine, in a predetermined position, for performing a work function on said workpiece, comprising:

positioning a transfer means relative to said workpiece whereby said pattern on said workpiece is disposed in a predetermined spatial relationship to a reference means of said transfer means;

detachably securing said workpiece to said transfer means with said pattern on said workpiece disposed in said predetermined spatial relationship;

transferring said transfer means with the attached workpiece into a position on said worktable whereby said workpiece is positioned on said worktable and said reference means of said transfer means registers with a reference means on said worktable disposed in said predetermined spatial relationship to said predetermined position of said pattern on said worktable;

detachably securing said workpiece to said worktable with said pattern of said workpiece disposed in said predetermined position;

detaching said transfer means from said workpiece; and removing said transfer means to permit said work function to be performed on said workpiece.

31. A method of positioning a pattern on a workpiece on a worktable of a computer controlled machine, in a predetermined position, for performing a work function on said workpiece, comprising:

positioning a template, having first and second reference lines, relative to said pattern on said workpiece whereby said pattern is disposed in a predetermined spatial relationship relative to said reference lines;

securing said workpiece to said template with said pattern disposed in said predetermined spatial relationship to said reference lines;

transferring said template with said workpiece detachably secured thereto onto said worktable with said workpiece disposed on said worktable and said reference lines of said template registering with first and second reference lines on said machine disposed in said predetermined spatial relationship to said pattern on said workpiece disposed in said predetermined position;

detachably securing said workpiece to said worktable;

detaching said template from said workpiece; and removing said template to permit said work function to be performed on said workpiece.

32. A method of positioning a pattern on a workpiece on a worktable of a computer controlled machine in a predetermined position, for performing a work function on said workpiece, comprising:

positioning a template having first and second reference edges, relative to said pattern on said workpiece whereby said pattern is disposed in a predetermined spatial relationship to said reference edges;

detachably securing said workpiece to said template with said pattern disposed in said predetermined spatial relationship to said reference edges;

transferring said template with said workpiece detachably secured thereto onto said worktable with said workpiece disposed on said worktable and said reference edges engaging abutment surfaces disposed on said machine disposed in said predetermined spatial relationship to said pattern disposed in said predetermined position;

detachably securing said workpiece to said worktable;

detaching said template from said workpiece; and removing said template to permit said work function to be performed on said workpiece.

33. A system for positioning a pattern on a workpiece on the worktable of a CNC machine for performing a work function on said workpiece, comprising:

first reference means disposed on said machine having a predetermined spatial relationship to a machine pattern defined by a programmed motion path of a working tool of said machine, corresponding to said workpiece pattern;

transfer means including a locator pattern corresponding to and registrable with said workpiece pattern, and second reference means registrable with said first reference means, having said predetermined spatial relationship to said locator pattern;

means for detachably securing said workpiece to said transfer means when said locator pattern is registered with said workpiece pattern; and means for detachably securing said workpiece to said machine when said workpiece is secured to said transfer means with said locator pattern disposed in registry with said workpiece pattern and said second reference means of said transfer means is registered with said first reference means of said machine, whereby upon registering said locator means of said transfer means with said workpiece pattern, detachably securing said workpiece to said transfer means with said locator and workpiece patterns disposed in registry, transferring said transfer means to said machine and positioning said attached workpiece on said worktable and positioning said second reference means in registry with said first reference means, detachably securing said workpiece to said worktable and detaching said transfer means from said workpiece, said workpiece pattern will be positioned on said worktable in a position coinciding with said machine pattern.

34. A system for positioning a pattern on a workpiece on the worktable of a CNC machine with said workpiece pattern being registered with a corresponding machine pattern defined by a programmed motion path of a working tool of said machine, comprising:

first reference means disposed on said machine, having a predetermined spatial relationship to said machine pattern;

transfer means having a locator pattern corresponding to and registrable with said workpiece pattern, and second reference means registrable with said first reference means, having said predetermined spatial relationship to said locator pattern; and means for detachably securing said workpiece to said worktable, whereby upon placing said workpiece on said worktable, positioning said second reference means of said transfer means in registry with said first reference means of said machine, moving said workpiece so that said workpiece pattern will be disposed in registry with said locator pattern of said transfer means, detachably securing said workpiece to said worktable while said workpiece pattern is disposed in registry with said locator pattern and removing said transfer means, said workpiece pattern will be positioned in registry with said machine pattern for performing said work function on said workpiece.

* * * * *